(12) United States Patent
Mantych (10) Patent No.: US 12,542,443 B2
(45) Date of Patent: Feb. 3, 2026

(54) MODULAR STORAGE UNIT WITH ELECTRICITY GENERATING PANEL

(71) Applicant: Milwaukee Electric Tool Corporation, Brookfield, WI (US)

(72) Inventor: Nicholas C. Mantych, Burlington, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 1035 days.

(21) Appl. No.: 17/123,931

(22) Filed: Dec. 16, 2020

(65) Prior Publication Data

US 2021/0104909 A1 Apr. 8, 2021

Related U.S. Application Data

(63) Continuation of application No. PCT/US2020/046359, filed on Aug. 14, 2020.

(60) Provisional application No. 62/888,695, filed on Aug. 19, 2019.

(51) Int. Cl.
| | |
|---|---|
| *H02J 7/00* | (2006.01) |
| *B25H 3/02* | (2006.01) |
| *B65D 25/20* | (2006.01) |
| *H01M 10/46* | (2006.01) |
| *H02J 7/35* | (2006.01) |
| *H02S 20/00* | (2014.01) |

(52) U.S. Cl.
CPC ............... *H02J 7/35* (2013.01); *B25H 3/021* (2013.01); *B65D 25/20* (2013.01); *H01M 10/465* (2013.01); *H02J 7/0042* (2013.01); *H02S 20/00* (2013.01)

(58) Field of Classification Search
USPC .................. 320/101, 102, 103, 105, 106
See application file for complete search history.

(56) References Cited

U.S. PATENT DOCUMENTS

| | | | |
|---|---|---|---|
| 3,424,334 A | 1/1969 | Goltz | |
| 5,890,613 A | 4/1999 | Williams | |
| 6,326,764 B1 * | 12/2001 | Virtudes | ................... H02J 7/35 |
| | | | 320/101 |
| 6,983,946 B2 | 1/2006 | Sullivan et al. | |
| 8,415,921 B1 | 4/2013 | Young et al. | |
| 8,415,924 B2 | 4/2013 | Matthias et al. | |
| 8,740,010 B1 | 6/2014 | Page | |
| 8,890,478 B2 | 11/2014 | Matthias et al. | |

(Continued)

FOREIGN PATENT DOCUMENTS

| | | |
|---|---|---|
| CN | 201523340 | 7/2010 |
| CN | 204119137 U | 1/2015 |

(Continued)

OTHER PUBLICATIONS

International Search Report and Written Opinion for International Application No. PCT/US2020/046359, dated Nov. 25, 2020, 11 pages.

(Continued)

*Primary Examiner* — Brian Ngo
(74) *Attorney, Agent, or Firm* — Reinhart Boerner Van Deuren s.c.

(57) ABSTRACT

A stackable power supply device, container or unit is provided. The power supply device includes an energy conversion module, such as a solar panel. The power supply device includes several power outlets, such as an interface to recharge rechargeable batteries for power tools, an electrical outlet, and a battery to store energy generated by the solar panel. The power supply device is stackable within a modular storage system.

12 Claims, 6 Drawing Sheets

(56) References Cited

U.S. PATENT DOCUMENTS

| | | | |
|---|---|---|---|
| 9,112,356 | B2 | 8/2015 | Cover |
| 9,375,835 | B1 | 6/2016 | Lin |
| 9,381,640 | B2 | 7/2016 | Van Der Linde et al. |
| 10,293,476 | B2 | 5/2019 | Fleischmann |
| 10,324,133 | B2 | 6/2019 | Zeng |
| 10,574,067 | B1 | 2/2020 | Hanson |
| 10,583,962 | B2 | 3/2020 | Brunner et al. |
| 10,618,692 | B2 | 4/2020 | Hori et al. |
| 10,651,664 | B2 | 5/2020 | Sergyeyenko |
| 10,750,833 | B2 | 8/2020 | Burchia |
| 2003/0139080 | A1 | 7/2003 | Lafragette et al. |
| 2006/0006838 | A1 | 1/2006 | Clarke |
| 2007/0138041 | A1 | 6/2007 | Welsh |
| 2010/0085745 | A1 | 4/2010 | Kristiansen et al. |
| 2010/0231161 | A1 | 9/2010 | Brown |
| 2011/0260588 | A1 | 10/2011 | Lin |
| 2011/0273132 | A1* | 11/2011 | Khaitan ............ H01M 10/46 320/155 |
| 2013/0011702 | A1* | 1/2013 | Horne ................ B60L 53/52 429/105 |
| 2013/0048631 | A1 | 2/2013 | Van Der Linde et al. |
| 2013/0051080 | A1 | 2/2013 | Van Der Linde et al. |
| 2013/0058711 | A1 | 3/2013 | Van Der Linde et al. |
| 2013/0127129 | A1 | 5/2013 | Bensman et al. |
| 2013/0134276 | A1 | 5/2013 | Van Der Linde et al. |
| 2013/0176688 | A1 | 7/2013 | Shen et al. |
| 2014/0265440 | A1 | 9/2014 | Chen et al. |
| 2015/0078811 | A1 | 3/2015 | Van Der Linde et al. |
| 2017/0063114 | A1 | 3/2017 | Briere |
| 2017/0166352 | A1 | 6/2017 | Hoppe et al. |
| 2018/0006470 | A1 | 1/2018 | Stacey et al. |
| 2018/0062145 | A1 | 3/2018 | Yang |
| 2018/0161975 | A1 | 6/2018 | Brunner |
| 2018/0183250 | A1 | 6/2018 | Byrne et al. |
| 2018/0186513 | A1 | 7/2018 | Brunner |
| 2019/0225371 | A1 | 7/2019 | Hoppe et al. |
| 2020/0003545 | A1* | 1/2020 | Trenholm .......... G01B 9/02091 |
| 2020/0006716 | A1* | 1/2020 | Wagoner ............ H02J 1/001 |
| 2020/0147781 | A1 | 5/2020 | Squiers et al. |
| 2020/0165036 | A1 | 5/2020 | Squiers et al. |
| 2021/0028740 | A1* | 1/2021 | Ramos ............... H02S 20/32 |

FOREIGN PATENT DOCUMENTS

| | | | | |
|---|---|---|---|---|
| CN | 104669226 | | 6/2015 | |
| CN | 205986300 | | 2/2017 | |
| CN | 206250243 | | 6/2017 | |
| CN | 206313514 | | 7/2017 | |
| CN | 206465063 | | 9/2017 | |
| CN | 207282576 | | 4/2018 | |
| CN | 208149497 | U * | 11/2018 | |
| CN | 109617218 | | 4/2019 | |
| CN | 208697388 | | 4/2019 | |
| CN | 105324935 | B * | 6/2019 | ............ F24S 20/20 |
| DE | 102008052158 | | 4/2010 | |
| DE | 102012213047 | | 1/2014 | |
| DE | 202014103695 | | 10/2014 | |
| DE | 102017211006 | | 1/2019 | |
| DE | 102018102982 | | 8/2019 | |
| EP | 1724069 | A2 | 11/2006 | |
| EP | 2537641 | B1 | 9/2016 | |
| EP | 2338650 | B1 | 10/2016 | |
| GB | 2211486 | | 7/1989 | |
| KR | 10-2000-0073212 | | 12/2000 | |
| WO | WO11151110 | | 12/2011 | |
| WO | WO14070858 | | 5/2014 | |
| WO | WO2014/125484 | | 8/2014 | |

OTHER PUBLICATIONS

Inter Partes Review No. 2024-01400, "Petition for Inter Partes Review of U.S. Pat. No. 11,365,026" Filed Sep. 17, 2024, 147 pages.

Exhibit 1001 in Petition for Inter Partes Review of U.S. Pat. No. 11,365,026 Filed Sep. 17, 2024, 66 pages.

Exhibit 1002 in Petition for Inter Partes Review of U.S. Pat. No. 11,365,026 Filed Sep. 17, 2024, 324 pages.

Exhibit 1003 in Petition for Inter Partes Review of U.S. Pat. No. 11,365,026 Filed Sep. 17, 2024, 139 pages.

Exhibit 1004 in Petition for Inter Partes Review of U.S. Pat. No. 11,365,026 Filed Sep. 17, 2024, 17 pages.

Exhibit 1005 in Petition for Inter Partes Review of U.S. Pat. No. 11,365,026 Filed Sep. 17, 2024, 9 pages.

Exhibit 1006 in Petition for Inter Partes Review of U.S. Pat. No. 11,365,026 Filed Sep. 17, 2024, 21 pages.

Exhibit 1007 in Petition for Inter Partes Review of U.S. Pat. No. 11,365,026 Filed Sep. 17, 2024, 16 pages.

Exhibit 1008 in Petition for Inter Partes Review of U.S. Pat. No. 11,365,026 Filed Sep. 17, 2024, 31 pages.

Exhibit 1009 in Petition for Inter Partes Review of U.S. Pat. No. 11,365,026 Filed Sep. 17, 2024, 6 pages.

Exhibit 1010 in Petition for Inter Partes Review of U.S. Pat. No. 11,365,026 Filed Sep. 17, 2024, 4 pages.

Exhibit 1011 in Petition for Inter Partes Review of U.S. Pat. No. 11,365,026 Filed Sep. 17, 2024, 16 pages.

Exhibit 1012 in Petition for Inter Partes Review of U.S. Pat. No. 11,365,026 Filed Sep. 17, 2024, 8 pages.

Exhibit 1013 in Petition for Inter Partes Review of U.S. Pat. No. 11,365,026 Filed Sep. 17, 2024, 19 pages.

Exhibit 1014 in Petition for Inter Partes Review of U.S. Pat. No. 11,365,026 Filed Sep. 17, 2024, 35 pages.

Exhibit 1015 in Petition for Inter Partes Review of U.S. Pat. No. 11,365,026 Filed Sep. 17, 2024, 11 pages.

Exhibit 1016 in Petition for Inter Partes Review of U.S. Pat. No. 11,365,026 Filed Sep. 17, 2024, 193 pages.

Exhibit 1017 in Petition for Inter Partes Review of U.S. Pat. No. 11,365,026 Filed Sep. 17, 2024, 29 pages.

Exhibit 1018 in Petition for Inter Partes Review of U.S. Pat. No. 11,365,026 Filed Sep. 17, 2024, 15 pages.

Exhibit 1019 in Petition for Inter Partes Review of U.S. Pat. No. 11,365,026 Filed Sep. 17, 2024, 19 pages.

Exhibit 1020 in Petition for Inter Partes Review of U.S. Pat. No. 11,365,026 Filed Sep. 17, 2024, 18 pages.

Exhibit 1021 in Petition for Inter Partes Review of U.S. Pat. No. 11,365,026 Filed Sep. 17, 2024, 313 pages.

Exhibit 1030 in Petition for Inter Partes Review of U.S. Pat. No. 11,365,026 Filed Sep. 17, 2024, 95 pages.

Exhibit 1031 in Petition for Inter Partes Review of U.S. Pat. No. 11,365,026 Filed Sep. 17, 2024, 5 pages.

Exhibit 1032 in Petition for Inter Partes Review of U.S. Pat. No. 11,365,026 Filed Sep. 17, 2024, 19 pages.

Inter Partes Review No. 2024-01401, "Petition for Inter Partes Review of U.S. Pat. No. 11,794,952" Filed Sep. 17, 2024, 165 pages.

Exhibit 1001 in Petition for Inter Partes Review of U.S. Pat. No. 11,794,952 Filed Sep. 17, 2024, 67 pages.

Exhibit 1002 Part 1 in Petition for Inter Partes Review of U.S. Pat. No. 11,794,952 Filed Sep. 17, 2024, 227 pages.

Exhibit 1002 Part 2 in Petition for Inter Partes Review of U.S. Pat. No. 11,794,952 Filed Sep. 17, 2024, 278 pages.

Exhibit 1003 in Petition for Inter Partes Review of U.S. Pat. No. 11,794,952 Filed Sep. 17, 2024, 168 pages.

Exhibit 1004 in Petition for Inter Partes Review of U.S. Pat. No. 11,794,952 Filed Sep. 17, 2024, 17 pages.

Exhibit 1005 in Petition for Inter Partes Review of U.S. Pat. No. 11,794,952 Filed Sep. 17, 2024, 9 pages.

Exhibit 1006 in Petition for Inter Partes Review of U.S. Pat. No. 11,794,952 Filed Sep. 17, 2024, 21 pages.

Exhibit 1007 in Petition for Inter Partes Review of U.S. Pat. No. 11,794,952 Filed Sep. 17, 2024, 16 pages.

Exhibit 1008 in Petition for Inter Partes Review of U.S. Pat. No. 11,794,952 Filed Sep. 17, 2024, 31 pages.

Exhibit 1009 in Petition for Inter Partes Review of U.S. Pat. No. 11,794,952 Filed Sep. 17, 2024, 6 pages.

Exhibit 1010 in Petition for Inter Partes Review of U.S. Pat. No. 11,794,952 Filed Sep. 17, 2024, 4 pages.

(56) References Cited

OTHER PUBLICATIONS

Exhibit 1011 in Petition for Inter Partes Review of U.S. Pat. No. 11,794,952 Filed Sep. 17, 2024, 16 pages.
Exhibit 1012 in Petition for Inter Partes Review of U.S. Pat. No. 11,794,952 Filed Sep. 17, 2024, 8 pages.
Exhibit 1013 in Petition for Inter Partes Review of U.S. Pat. No. 11,794,952 Filed Sep. 17, 2024, 19 pages.
Exhibit 1014 in Petition for Inter Partes Review of U.S. Pat. No. 11,794,952 Filed Sep. 17, 2024, 35 pages.
Exhibit 1015 in Petition for Inter Partes Review of U.S. Pat. No. 11,794,952 Filed Sep. 17, 2024, 11 pages.
Exhibit 1016 in Petition for Inter Partes Review of U.S. Pat. No. 11,794,952 Filed Sep. 17, 2024, 193 pages.
Exhibit 1017 in Petition for Inter Partes Review of U.S. Pat. No. 11,794,952 Filed Sep. 17, 2024, 29 pages.
Exhibit 1018 in Petition for Inter Partes Review of U.S. Pat. No. 11,794,952 Filed Sep. 17, 2024, 15 pages.
Exhibit 1019 in Petition for Inter Partes Review of U.S. Pat. No. 11,794,952 Filed Sep. 17, 2024, 19 pages.
Exhibit 1020 in Petition for Inter Partes Review of U.S. Pat. No. 11,794,952 Filed Sep. 17, 2024, 18 pages.
Exhibit 1021 in Petition for Inter Partes Review of U.S. Pat. No. 11,794,952 Filed Sep. 17, 2024, 313 pages.
Exhibit 1022 in Petition for Inter Partes Review of U.S. Pat. No. 11,794,952 Filed Sep. 17, 2024, 324 pages.
Exhibit 1023 in Petition for Inter Partes Review of U.S. Pat. No. 11,794,952 Filed Sep. 17, 2024, 5 pages.
Exhibit 1024 in Petition for Inter Partes Review of U.S. Pat. No. 11,794,952 Filed Sep. 17, 2024, 7 pages.
Exhibit 1025 in Petition for Inter Partes Review of U.S. Pat. No. 11,794,952 Filed Sep. 17, 2024, 15 pages.
Exhibit 1026 in Petition for Inter Partes Review of U.S. Pat. No. 11,794,952 Filed Sep. 17, 2024, 37 pages.
Exhibit 1027 in Petition for Inter Partes Review of U.S. Pat. No. 11,794,952 Filed Sep. 17, 2024, 7 pages.
Exhibit 1028 in Petition for Inter Partes Review of U.S. Pat. No. 11,794,952 Filed Sep. 17, 2024, 33 pages.
Exhibit 1030 in Petition for Inter Partes Review of U.S. Pat. No. 11,794,952 Filed Sep. 17, 2024, 95 pages.
Exhibit 1031 in Petition for Inter Partes Review of U.S. Pat. No. 11,794,952 Filed Sep. 17, 2024, 5 pages.
Exhibit 1032 in Petition for Inter Partes Review of U.S. Pat. No. 11,794,952 Filed Sep. 17, 2024, 60 pages.

* cited by examiner

FIG. 7

MODULAR STORAGE UNIT WITH ELECTRICITY GENERATING PANEL

CROSS-REFERENCE TO RELATED PATENT APPLICATION

The present application is a continuation of International Patent Application No. PCT/US2020/046359, filed Aug. 14, 2020, which claims the benefit of and priority to 62/888,695, filed on Aug. 19, 2019, which are incorporated herein by reference in their entireties.

BACKGROUND OF THE INVENTION

The present disclosure is directed generally to the field of tool storage systems and related devices. The present disclosure relates specifically to a device or tool storage container that includes a panel configured to provide electricity, such as a solar panel, and a coupling mechanism to detachably couple the device or tool storage container to another such device or container, such as a modular tool storage unit.

Tool storage units are often used to transport tools and tool accessories. Some storage units are designed to incorporate into a modular storage system. Within a modular storage system, different units, devices and/or containers may provide varying functions, such as storage and/or supplying energy.

SUMMARY OF THE INVENTION

One embodiment of invention includes a stackable power supply unit configured to couple to a stackable storage unit. The stackable power supply unit includes a housing having a bottom surface, coupling components extending from the bottom surface, a solar panel coupled to the housing, a first electrical outlet electrically coupled to the solar panel, and an adjustment mechanism configured to rotate the solar panel with respect to the housing around a first axis. The coupling components are configured to couple the bottom surface of the stackable power supply unit to a top surface of the stackable storage unit.

Another embodiment of this application includes a container assembly. The container assembly includes a power supply unit and a storage unit. The power supply unit includes a first housing, a lower surface of the first housing, a first coupling component extending from the lower surface, and a panel (such as a solar panel) configured to provide electricity. The panel is coupled to the first housing, and the panel defines an upper surface of the power supply unit. The storage unit includes a second housing, a storage space within the second housing, a top surface of the second housing, and a second coupling component located on the top surface of the second housing. The power supply unit and the storage unit are coupled together via the first coupling component interfacing with the second coupling component.

Another embodiment of invention includes a stackable power supply unit configured to couple to a stackable storage unit. The stackable power supply unit includes a housing including a lower surface, coupling components extending from the lower surface, the coupling components configured to couple the lower surface of the stackable power supply unit to a top surface of a stackable storage unit, and a top panel comprising an upper surface. The top panel includes a first portion and a second portion distinct from the first portion. The first portion includes a solar panel and the second portion includes a plurality of recesses that define apertures within the solar panel.

Another embodiment of this application includes a tool storage device that includes a housing, a bottom face, a coupler extending from the bottom face, and a top lid coupled to the base. A solar panel is coupled to the top lid, and an adjustment mechanism alters the position and orientation of the solar panel with respect to the base. In a specific embodiment the solar panel can be pivotally adjusted with respect to various dimensions of the storage unit.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION

Referring generally to the figures, various embodiments of a stackable power supply device, container or unit are shown. One or more of the devices are configured to selectively couple and decouple with tool storage units. The power supply device includes a top panel configured to provide electricity, such as a solar panel. The top panel and/or the solar panel can be pivotally adjusted to support the solar panel in various positions and orientations. The device also includes an energy storage device, such as a battery, and one or more electrical outputs, such as plugs, USB outlets, and/or battery chargers that couple to a rechargeable power tool battery.

Referring to FIGS. 1-5, a container and/or device, such as power supply device 10, is shown according to an exemplary embodiment. An energy conversion module, such as a panel configured to provide electricity, is shown as solar panel 28, is coupled to top panel 26 of power supply device 10, and top panel 26 is coupled to housing 20. Top panel 26 and solar panel 28 pivot with respect to housing 20 in direction 42 around axis 40. Adjustment mechanism 30 maintains top panel 26 in a plurality of positions with respect to housing 20. Top panel 26 and solar panel 28 faces direction 34. The position and orientation of top panel 26 can be supported by adjustment mechanism 30 to permit solar panel 28 to face in different directions 34.

Figure 1:
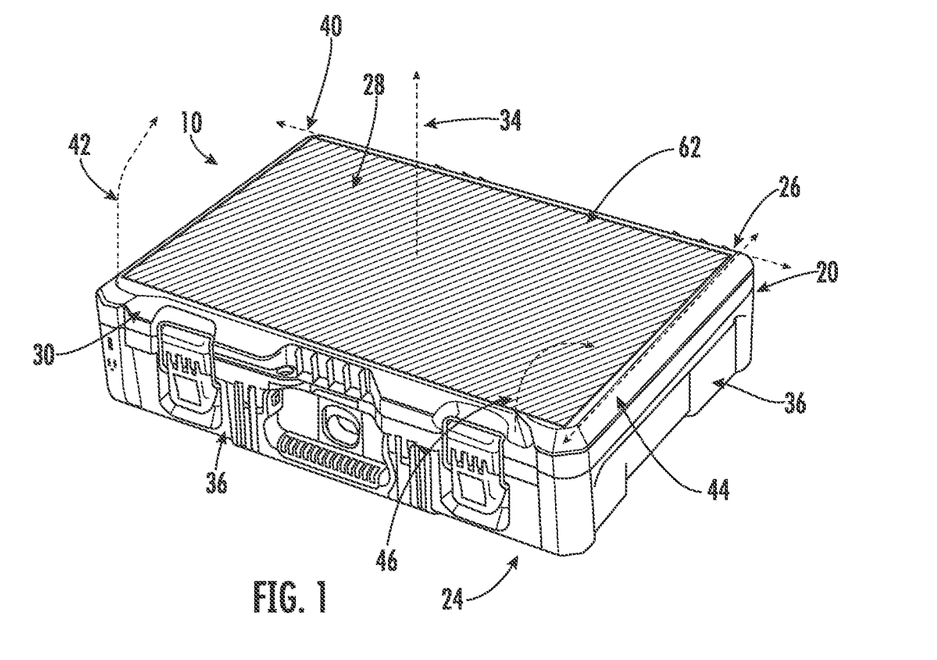
FIG. 1 is a perspective view of a power supply device, according to an exemplary embodiment.
Figure 3:
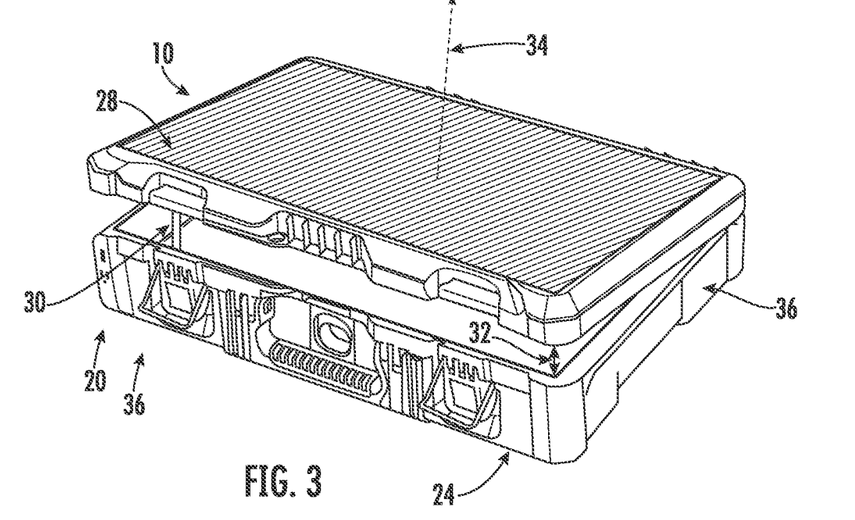
FIG. 3 is a perspective view of the power supply device of FIG. 1 with a lid in a partially open position, according to an exemplary embodiment.

For example, in FIG. 1 solar panel 28 faces in direction 34 which, when the top panel 26 is closed, is oriented in the vertical direction. In FIG. 3, after adjustment mechanism 30 is manipulated, solar panel 28 faces in new direction 34, which is at a small angle relative to vertical. In FIG. 3, top panel 26 defines angle 32 with respect to housing 20. Solar panel 28 is pivotally coupled to top panel 26.

Figure 4:
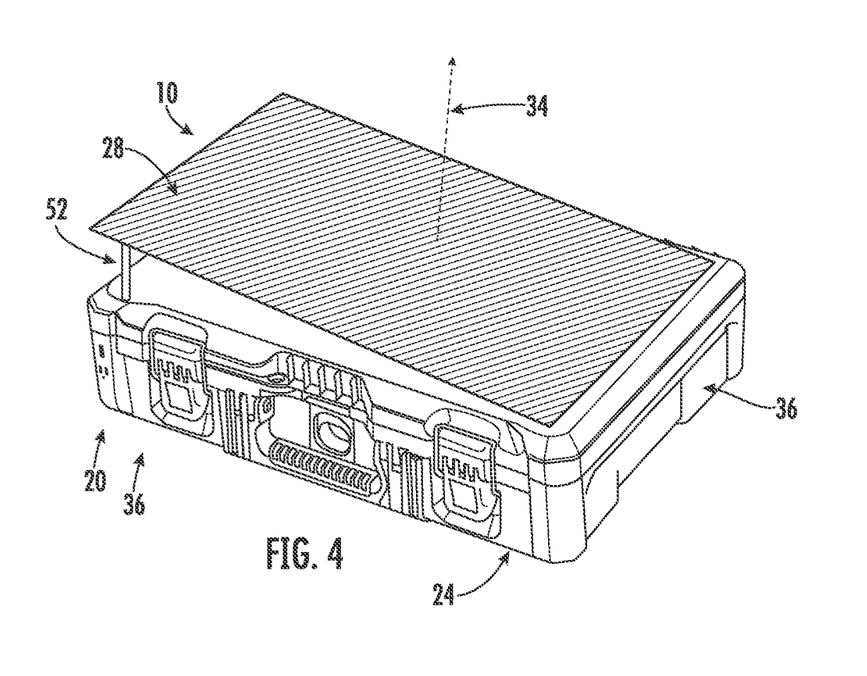
FIG. 4 is a perspective view of the power supply device of FIG. 1 with the solar panel supported in an angled position, according to an exemplary embodiment.
Figure 5:
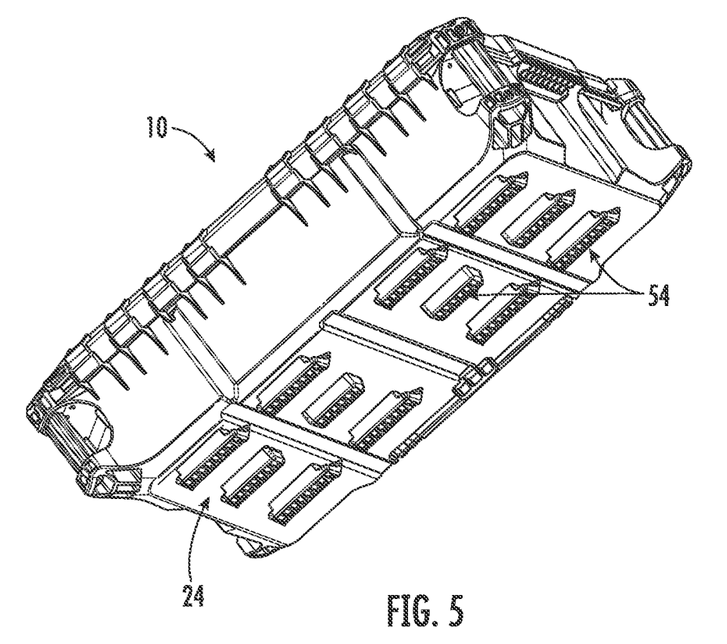
FIG. 5 is a bottom perspective view of the power supply device of FIG. 1, according to an exemplary embodiment.

Referring to FIG. 4, second adjustment mechanism 52 maintains solar panel 28 in a plurality of positions with respect to top panel 26. Solar panel 28 pivots with respect to top panel 26 in direction 46 around axis 44. Axis 44 is distinct from axis 40, and in a specific embodiment axis 44 is perpendicular to axis 40. Collectively, adjustment mechanisms 30 and 52 enable positioning solar panel 28 in a plurality of orientations with respect to top panel 26 and to housing 20. To increase an amount of light received by solar panel 28, adjustment mechanisms 30 and 52 can be adjusted until direction 34 of solar panel 28 is directed at or near a light source (e.g., the sun).

In one embodiment power supply device 10 includes a space for storage, shown as storage compartment 60, to store objects, such as tools. In an alternate embodiment power storage device 10 does not include a storage compartment 60.

Figure 2:
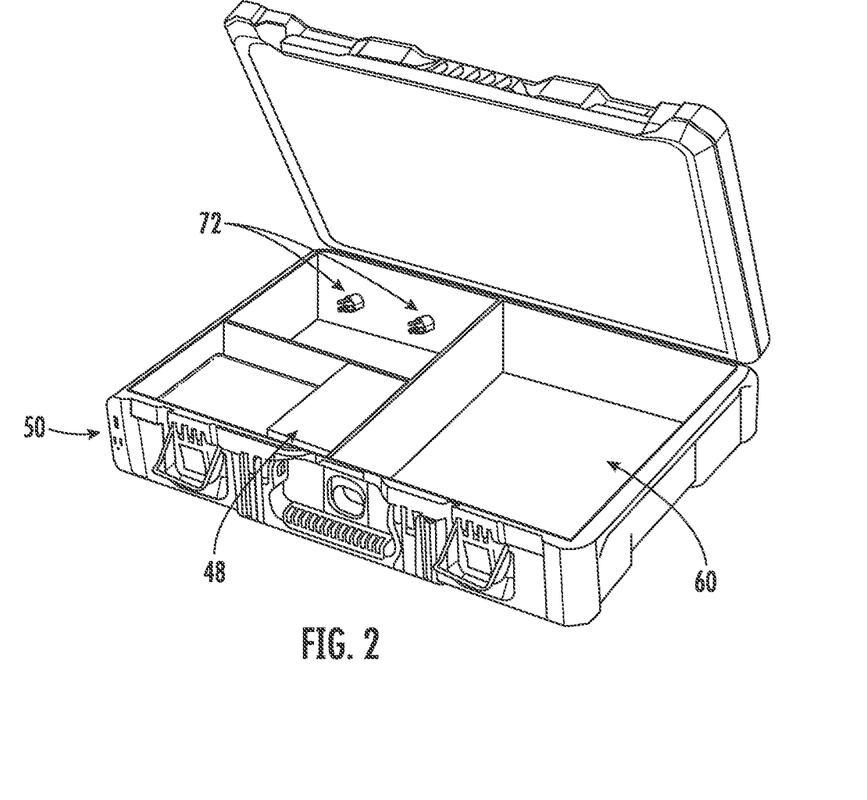
FIG. 2 is a perspective view of the power supply device of FIG. 1 with a lid in a fully open position, according to an exemplary embodiment.

Referring to FIG. 2, in various embodiments, power supply device 10 includes one or more electrical interfaces (e.g., electrical outlets) to discharge generated by solar panel 28. Power supply device 10 includes one or more battery interfaces 72, which couple to rechargeable batteries for power tools. Power supply device 10 includes an energy storage device, shown as battery 48, such as a power tool battery and/or a battery fixedly coupled to the power supply device 10, to store energy generated by solar panel 28. Power supply device 10 includes electrical outlets 50, such as an AC electrical outlet and/or a USB outlet, to permit external devices to plug into power supply device 10 and receive energy being generated by solar panel 28 and/or energy that was previously generated by solar panel 28 and stored in battery 48. Solar panel 28 is electrically coupled to battery 48, and battery 48 is electrically coupled to solar panel 28 such that battery 48 receives power from solar panel 28. In one embodiment solar panel 28 is electrically coupled to outlets 50 via battery 48. In various embodiments, power supply device 10 includes an electronic subsystem such as an integrated site lighting, a Bluetooth radio, a WiFi Hotspot, such as a 5G WiFi HotSpot, a BLE Mesh Network, and/or a OneKey mesh network hub, and the electronic subsystem is electrically coupled to one of the solar panel 28 and/or one of the batteries in power supply device 10.

Housing 20 includes a lower surface, shown as bottom surface 24. One or more coupling components, shown as tongues 54, extend from bottom surface 24 (shown in FIG. 5). In a specific embodiment, the one or more tongues 54 of power storage device 10 couple to a top surface of a modular storage unit (e.g., a stackable storage unit) in a stackable arrangement via an interface compatible with the coupling mechanism(s) described in International Patent Application No. PCT/US2018/044629.

Figure 6:
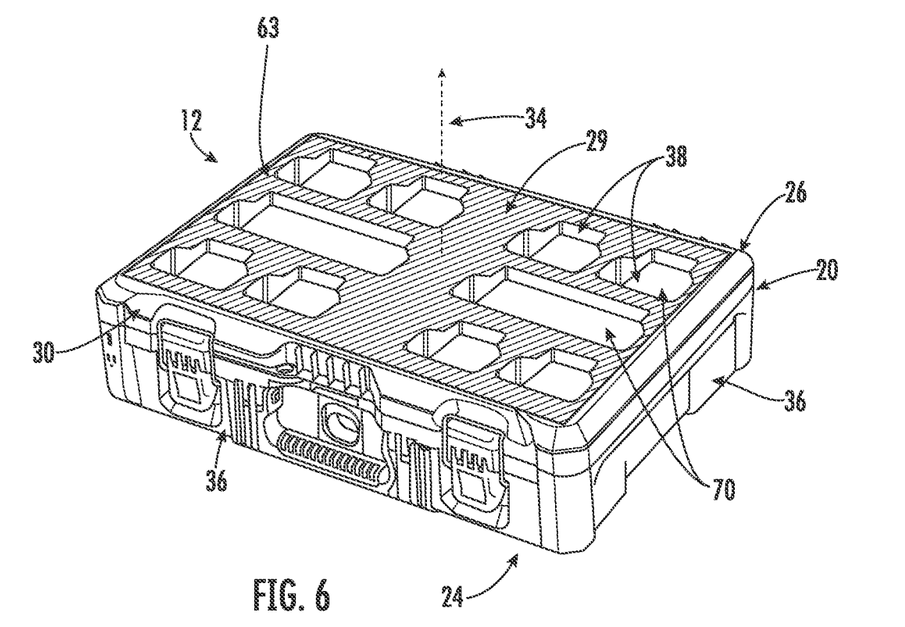
FIG. 6 is a perspective view of a power supply device, according to another exemplary embodiment.
Figure 7:
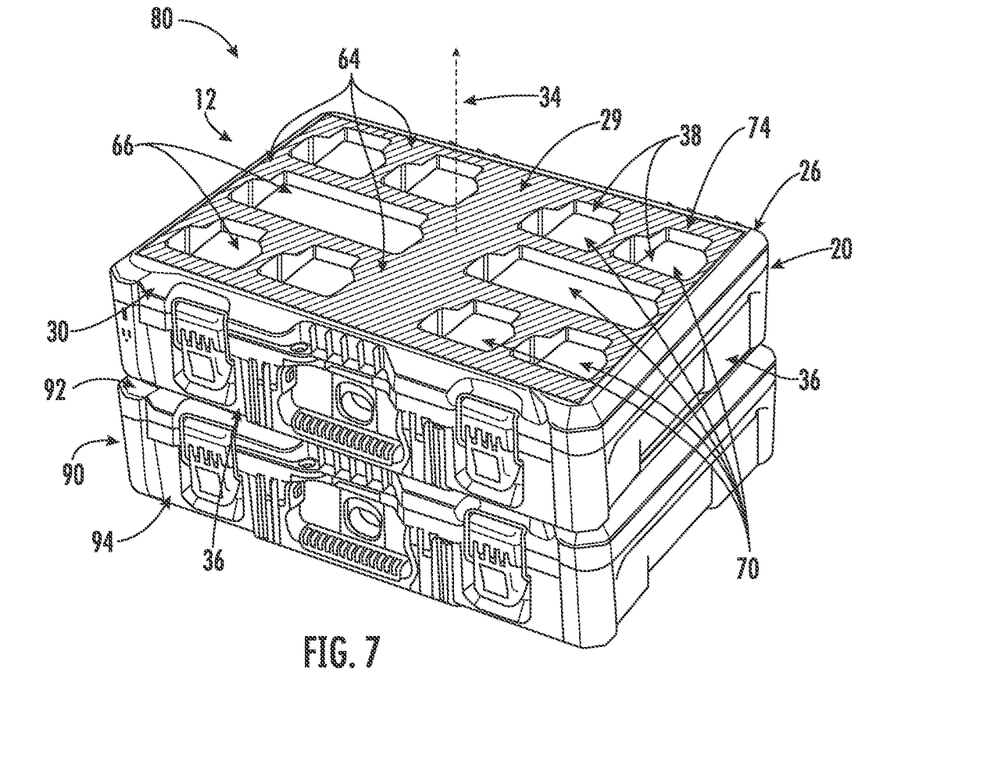
FIG. 7 is a perspective view of a modular storage system, according to an exemplary embodiment.

Referring to FIGS. 6-7, a container and/or device, such as a power supply device 12, is shown according to an exemplary embodiment. Power supply device 12 is substantially the same as power supply device 10 except for the differences discussed herein. Power supply device 12 includes a solar panel 29. Solar panel 29 is substantially the same as solar panel 28 except that solar panel 29 defines several apertures 70 through which a coupling mechanism, shown as recess 38, can be accessed. Recess 38 in FIG. 4 is configured to interface with tongues 54 in FIG. 3 to couple power supply device 12 to storage units, containers and/or devices. As a result, modular storage units can be coupled to the top of power supply device 12 by coupling with one or more of recesses 38.

Described another way, upper surface 63 of power supply device 12 includes a first portion 64 and a second portion 66 (FIG. 7). First portion 64 includes solar panel 29, and second portion 66 includes recesses 38 that define apertures 70 within solar panel 29. Second portion 66 includes coupling components 74 that can be accessed through apertures 70 of first portion 64.

Turning to FIG. 7, a modular storage system, shown as container assembly 80, is shown. Container assembly 80 includes stackable storage device 90 and power supply device 10. Stackable storage device 90 is substantially the same as power supply device 10 and 12 except for the differences discussed herein. Stackable storage device 90 includes housing 94 and upper surface 92. Upper surface 92 of stackable storage device 90 includes one or more coupling components to couple stackable storage device 90 to bottom surface 24 of power storage device 12.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A stackable power supply unit configured to couple to a stackable storage unit, the stackable power supply unit comprising:
    a housing comprising a bottom surface;
    coupling components extending outward from the bottom surface, the coupling components configured to couple the bottom surface of the stackable power supply unit to one or more recesses on a top surface of the stackable storage unit;
    a top panel coupled to the housing, the top panel opposing the bottom surface of the housing;
    a solar panel pivotally coupled to the top panel, the solar panel pivotable with respect to the top panel;
    a first electrical outlet electrically coupled to the solar panel; and
    an adjustment mechanism configured to rotate the solar panel with respect to the housing around a first axis;
    wherein the top panel is pivotable with respect to the housing around the first axis.

2. The stackable power supply unit of claim 1, further comprising:
    an energy storage device electrically coupled to the solar panel, wherein the energy storage device receives power from the solar panel.

3. The stackable power supply unit of claim 2, further comprising:
    a second electrical outlet electrically coupled to the solar panel, the second electrical outlet configured to couple with a rechargeable battery.

4. The stackable power supply unit of claim 3, wherein the first electrical outlet is electrically coupled to the solar panel via the energy storage device.

5. The stackable power supply unit of claim 1, further comprising a second adjustment mechanism configured to rotate the solar panel with respect to the housing around a second axis distinct from the first axis.

6. The stackable power supply unit of claim 5, wherein the second axis is perpendicular to the first axis.

7. The stackable power supply unit of claim 1, wherein the adjustment mechanism is configured to maintain a position of the solar panel with respect to the housing.

8. The stackable power supply unit of claim 1, further comprising a storage space defined within the housing, wherein the top panel encloses the storage space.

9. The stackable power supply unit of claim 1, wherein the coupling components each comprise one or more tongues that define one or more channels.

10. The stackable power supply unit of claim 9, wherein the one or more channels are positioned between each coupling component and the bottom surface of the housing.

11. A stackable power supply unit configured to couple to a stackable storage unit, the stackable power supply unit comprising:
    a housing comprising a bottom surface;
    coupling components extending outward from the bottom surface, the coupling components configured to couple the bottom surface of the stackable power supply unit to one or more recesses on a top surface of the stackable storage unit;
    a top panel coupled to the housing, the top panel opposing the bottom surface of the housing;
    a solar panel pivotally coupled to the top panel, the solar panel pivotable with respect to the top panel;
    a first electrical outlet electrically coupled to the solar panel;
    an adjustment mechanism configured to rotate the solar panel with respect to the housing around a first axis; and
    a second adjustment mechanism configured to rotate the solar panel with respect to the housing around a second axis distinct from the first axis;
    wherein the top panel is pivotable with respect to the housing around the first axis;
    wherein the solar panel pivots with respect to the top panel when the solar panel rotates around the second axis.

12. A stackable power supply unit configured to couple to a stackable storage unit, the stackable power supply unit comprising:
    a housing comprising a bottom surface;
    coupling components extending outward from the bottom surface, the coupling components configured to couple the bottom surface of the stackable power supply unit to one or more recesses on a top surface of the stackable storage unit;
    a top panel coupled to the housing, the top panel opposing the bottom surface of the housing;
    a solar panel pivotally coupled to the top panel, the solar panel pivotable with respect to the top panel;
    a first electrical outlet electrically coupled to the solar panel; and
    an adjustment mechanism configured to rotate the solar panel with respect to the housing around a first axis;
    wherein the top panel is pivotable with respect to the housing around the first axis;
    wherein, when the top panel is in a closed position, an upper surface of the solar panel has a first orientation and faces a vertical direction, and wherein, when the solar panel is moved to a second orientation, the upper surface of the solar panel is positioned at an angle relative to the vertical direction.

* * * * *